Patented Oct. 17, 1933

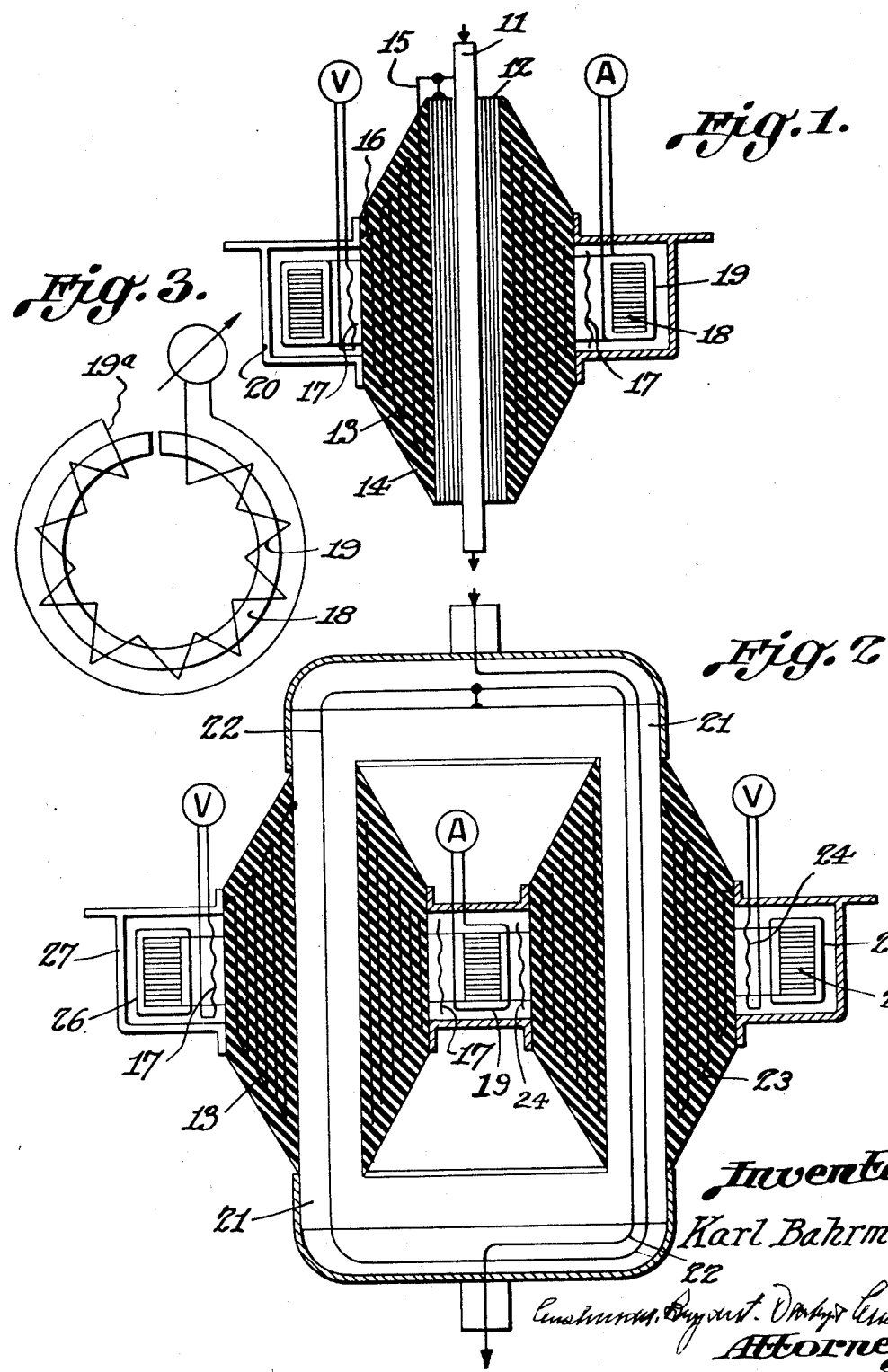

1,930,604

UNITED STATES PATENT OFFICE 1,930,604

CURRENT AND POTENTIAL MEASURING TRANSFORMER

Karl Bahrmann, Dresden, Germany, assignor to Koch & Sterzel Aktiengesellschaft, Dresden, Germany, a company of Germany Application December 13, 1930, Serial No. 502,239, and in Germany December 16, 1929

6 Claims. (Cl. 175—358)

The present invention relates to a current and potential measuring transformer.

It has already been proposed to so construct potential transformers as lead-ins that the conductor carrying the highest potential current passes axially through the potential transformer, while between the poles, namely, the lead-through conductor and the iron core surrounding it, a compulsory potential graduation takes place by means of the high potential winding conductively connecting the two poles together. Otherwise current and potential transformers have always been separately constructed apparatus.

The principal object of the present invention is to provide a compact combined current and potential measuring transformer.

According to the invention, it is proposed to combine current and potential transformers into one unit in such manner that by avoiding duplicate constructive parts and using the potential transformer as insulation for the current transformer, it becomes even externally, an apparatus of minimum dimensions. In this, the magnet system influenced by the current is perpendicular to the system influenced by the potential, and surrounds the latter. At the same time, according to the invention, the induction system can be used as a lead-in with controlled potential distribution.

In the drawing, are shown examples of execution according to the invention.

Figure 1 shows in vertical cross section an insulated bushed transformer having a single bar-shaped core, through which the current conductor is passed.

Figure 2 shows also in vertical cross section a modified arrangement having a rectangular core, each vertical limb of which carries a transformer system as in Figure 1.

Figure 3 is a diagrammatic showing illustrating the circuit of one of the low potential windings.

According to Figure 1 the current conductor 11 running axially, and parallel to or passing through the iron core 12, passes through the high potential lead-in formed by the high potential winding 13 of the potential transformer in combination with insulating material 14. The commencement 15 of the high potential winding is conductively connected through the iron core 12 with the high potential conductor 11, while the end 16 is earthed. The low potential winding 17 of the potential transformer is carried round the high potential winding 13. Over this winding 13, is the slotted ring shaped iron core 18 of the current transformer, which again is enclosed by the low potential winding 19 of the current transformer. The end 19a of the low potential winding 19 is, in order to avoid the production of a short-circuit winding, carried back to the commencement of the winding as shown in Fig. 3. In Figure 2, the low potential winding 17 (potential transformer) is disposed concentrically about the high potential winding 13 and outside the insulator 14 as has been mentioned with regard to Figure 1. The low potential winding 24 (potential transformer) is similarly disposed with relation to the high potential winding 23. Each of these low potential windings is closed through a circuit incorporating a voltage measuring instrument, and each of said circuits is entirely independent with relation to the other. The low potential windings 17 and 19 are, in common with the iron core 18, surrounded by a slotted flange-like casing 20 which, in the case of high current strengths, is produced from non-magnetic material and can serve as a lead-in flange. Thus a single bar lead-in current transformer is combined with a potential transformer in which the magnetic system influenced by the current is arranged perpendicularly to that influenced by the potential, and surrounds the latter or takes it within itself. The conductor 11 through which the current flows, passes here axially through the current transformer 13, 17, and the current transformer core 18 which is at earth potential, as also the winding 19 carried thereby.

The current conductor 11 is a portion of the main conducting lead to the consumer. The transformer core 12 is of single or bar-shape and is completely enclosed in its vertical direction by the bushed or sleeved insulator 14. The laminated core 12 is rigidly secured within the insulating member, within which latter is embedded the high potential winding 16, the latter thereby surrounding the iron core. Concentrically disposed about the centre of the primary winding 16 and outside the insulating member 14 is the secondary winding 17 (voltage transformer), the arrangement being such that a transformer is produced which does not have the usual rectangular or closed core path.

Positive control of the potential is attained since the commencement 15 of the high potential winding 13 is connected to the conductor 11 or the iron core 12, whilst the terminating end of said winding is earthed through the casing 20. Thus, variation of the potential takes place from the commencement 15 towards the end 16 of the winding and at the ends of each layer thereof. As in the usual way the potential of the conductor is constant, the commencement of the winding always possesses a constant voltage, which is not the case if the insulator is provided with conductive elements which are only coupled capacitatively to the conductor supplying the potential. In the latter case the voltage may be adjusted as desired in such manner that there is no positive control thereof.

The low potential winding 17 of the voltage transformer is, as above-mentioned, concentrically wound about the centre of the high potential winding 13 and is also disposed outside the insulator 14. This winding 17 is of a length which corresponds to the measuring capacity within the casing 20. Concentrically disposed around the winding 17 and also located within the casing 20 is an annular split iron core 18 as in Figure 1. This core carries a winding 19, said winding being composed of turns arranged around the cross sectional periphery of said ring. The end turn of this winding 19 is not conducted directly within the casing 20, but, as shown, is led back to the commencement of the winding, from which it is connected to the ammeter or equivalent current measuring instrument.

In Figure 2 is shown a multiple conductor loop current transformer, in which the systems are duplicated. The iron core 21 of the potential transformer is closed, and parallel thereto are the primary windings 22 of the current transformer. The two high potential windings 13 and 23 of the potential transformer are surrounded by their low potential windings 17 and 24, the two low potential windings being either connected in parallel or connected separately with the users. The commencement of each of the windings 13 and 23 is electrically connected with one of the vertical arms of a rectangular iron core 21, the latter being supplied with the initial potential through the leads 22. The terminating ends of the respective high potential windings 13 and 23 are grounded through the casing 27 and the current passing through the apparatus is divided through the respective portions of the core 21 surrounded by the windings 13 and 23. The iron core 25 surrounding the voltage secondary windings 17 and 24 and carrying the winding 26 feeding the current measuring instrument A, is of unitary construction. In the construction shown in Figure 2, the core 25 is of rectangular or similar form and is provided with a central limb. Each limb of the iron core can be surrounded by a ring shaped current transformer core with low potential winding, in the manner shown in Figure 1, one of which can serve for measuring purposes and the other for the supply of relays. It is, however, also possible by means of a jacket core 25, for example in the shape of an eight, to let both limbs of the potential transformer core 21 be surrounded when, in case of necessity, the central bar of the current transformer core, which carries the low potential winding 19 of the current transformer, is slit. Preferably, here the known windings 26 are used on both yokes of the jacket core for the purpose of increasing the output of the transformer. It is also easily possible to use a number of such current transformer iron cores when user current circuits independent of each other are to be supplied. The whole double lead-in current and potential transformer is again fastened on an earthed supporting flange 27. With both forms of construction, the high potential winding of the potential transformer embedded in the insulating material, serves for the compulsory potential control in or along the insulating material between the iron core which is on the primary conductor potential of the transformer, and the low potential winding of the potential transformer, or current transformer, and the earthed flange.

What I claim and desire to secure by Letters Patent of the United States is:—

1. The combination with a conductor, of a measuring transformer apparatus comprising a core surrounding the conductor, a primary winding surrounding said core, said primary winding being electrically connected with said conductor and said core, a secondary winding surrounding said primary winding, a grounded casing enclosing said apparatus, said primary winding being electrically connected to said casing whereby compulsory potential control is provided.

2. The combination with a conductor, of a measuring transformer apparatus comprising a core surrounding the conductor and electrically connected thereto, an insulating body surrounding said core, a primary winding embedded in said insulating body, said primary winding being concentric with said core and of layerwise construction, the layers decreasing in width from the inner layer to the outer layer, the inner layer being electrically connected to said core and the outer layer being connected to ground and a secondary winding surrounding said primary winding.

3. The combination with a conductor, of a measuring transformer apparatus comprising a core surrounding the conductor and electrically connected thereto, an insulating body surrounding said core, a primary winding embedded in said insulating body, said primary winding being concentric with said core and of layerwise construction, the layers decreasing in width from the inner layer to the outer layer, the inner layer being electrically connected to said core and the outer layer being connected to ground and a secondary winding surrounding said primary winding, said secondary winding being arranged in a plane perpendicular to said core.

4. The combination with a conductor, of a measuring transformer apparatus comprising an open rectangular core electrically connected to said conductor, opposite pairs of legs of said rectangular core being surrounded by an insulating body, a primary winding embedded in each of said insulating bodies, each of said primary windings being concentric with the respective leg of the core and of layerwise construction, the layers decreasing in width from the inner layer to the outer layer, the inner layer being connected to said core and the outer layer being connected to ground and a secondary winding surrounding each of said primary windings.

5. The combination with a conductor, of a measuring transformer apparatus comprising an open rectangular core electrically connected to said conductor, the conductor being formed into loops extending parallel with said core, an insulating body surrounding each leg of an opposite pair of legs of said rectangular core, a primary winding embedded in each of the respective insulating bodies, the primary windings being concentric with the respective legs of the core and of layerwise construction, the layers decreasing in width from the inner layer to the outer layer, the inner layer of each being connected to said core and the outer layer of each being connected to ground, and a secondary winding surrounding each of said primary windings.

6. The combination with a conductor, of a measuring transformer apparatus comprising an open rectangular core electrically connected to said conductor, each leg of an opposite pair of legs of said rectangular core being surrounded by an insulating body, a primary winding embedded in each of the insulating bodies, each of said primary windings being concentric with the respective leg of the core and of layerwise construction, the layers decreasing in width from the inner layer to the outer layer, the inner layer being electrically connected to said core and the outer layer being connected to ground and a secondary winding surrounding each of said primary windings, said secondary windings being arranged in a plane perpendicular to the legs of said core which carry the primary windings.

KARL BAHRMANN.